(12) United States Patent
Ningrat et al.

(10) Patent No.: US 8,698,756 B2
(45) Date of Patent: Apr. 15, 2014

(54) INTERRUPT REDUCTION METHOD IN TOUCH SCREEN CONTROLLER

(75) Inventors: Kusuma Adi Ningrat, Singapore (SG); Chee Yu Ng, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 511 days.

(21) Appl. No.: 12/265,615

(22) Filed: Nov. 5, 2008

(65) Prior Publication Data

US 2009/0115740 A1 May 7, 2009

Related U.S. Application Data

(60) Provisional application No. 61/002,122, filed on Nov. 6, 2007.

(51) Int. Cl.
*G06F 3/041* (2006.01)
*H03K 17/94* (2006.01)
*H03M 11/00* (2006.01)

(52) U.S. Cl.
USPC ............................................ 345/173; 341/22

(58) Field of Classification Search
USPC ......................................................... 345/173
See application file for complete search history.

(56) References Cited

U.S. PATENT DOCUMENTS

| | | | |
|---|---|---|---|
| 4,103,252 A * | 7/1978 | Bobick | 331/48 |
| 4,300,127 A | 11/1981 | Bernin | |
| 5,463,386 A | 10/1995 | Wu | |
| 5,493,648 A * | 2/1996 | Murray et al. | 345/537 |
| 5,648,642 A | 7/1997 | Miller et al. | |
| 5,798,750 A * | 8/1998 | Ozaki | 345/656 |
| 5,805,085 A | 9/1998 | Hsu et al. | |
| 5,982,302 A * | 11/1999 | Ure | 341/22 |
| 6,323,445 B1 | 11/2001 | Yee | |
| 6,417,787 B1 | 7/2002 | Hsu | |

(Continued)

FOREIGN PATENT DOCUMENTS

WO 0195110 A2 12/2001

OTHER PUBLICATIONS

Examination Report, Australian Patent Office, app. No. SG 200718899-8, Woden Act 2606, Australia, mailing date Jun. 16, 2011, pp. 5.

(Continued)

*Primary Examiner* — Charles V Hicks
(74) *Attorney, Agent, or Firm* — Hogan Lovells US LLP (57) ABSTRACT

Integration of a FIFO memory, FIFO threshold and a timer, along with the other components of a touch screen system allows the number of interrupts to the touch screen controller to be reduced while allowing all point data to be acquired and preserved. In the first touch-detect event, an interrupt is issued to inform the host. The touch screen controller then automatically acquires data as long as touch is detected without host intervention. A FIFO threshold defines the minimum number of data points in FIFO memory before it issues an interrupt to inform the host that data is ready to be fetched. The timer is started once touch is detected. On every single data acquired, the timer is reset. In the event where touch is no longer detected, the timer keeps on counting until the time-up limit is reached. In this event, the touch screen controller will issue an interrupt informing the host the pen is lifted. The host then checks whether there is still data left in FIFO memory to be read.

14 Claims, 6 Drawing Sheets

(56) References Cited

U.S. PATENT DOCUMENTS

| | | |
|---|---|---|
| 6,961,866 B2 | 11/2005 | Janin et al. |
| 6,992,601 B2 | 1/2006 | Chiu et al. |
| 7,167,107 B2 | 1/2007 | Patino et al. |
| 7,330,134 B2 | 2/2008 | Chen |
| 7,888,610 B2 | 2/2011 | Lim |
| 7,986,306 B2 | 7/2011 | Eich et al. |
| 8,072,429 B2 | 12/2011 | Grivna |
| 8,223,136 B2 * | 7/2012 | Hu et al. .................. 345/179 |
| 8,284,080 B2 | 10/2012 | Ng et al. |
| 2002/0041270 A1 | 4/2002 | Chiu et al. |
| 2003/0132922 A1 * | 7/2003 | Philipp .................. 345/173 |
| 2006/0227115 A1 * | 10/2006 | Fry .................. 345/173 |
| 2007/0257899 A1 | 11/2007 | Ao et al. |
| 2007/0285440 A1 * | 12/2007 | MacInnis et al. .................. 345/660 |
| 2008/0048990 A1 | 2/2008 | Cho et al. |
| 2008/0150906 A1 | 6/2008 | Grivna |
| 2008/0284738 A1 * | 11/2008 | Hovden et al. .................. 345/173 |
| 2008/0309490 A1 | 12/2008 | Honkanen et al. |
| 2010/0019780 A1 | 1/2010 | Bulea |

OTHER PUBLICATIONS

2nd Written Opinion, Australian Patent Office, app. No. SG 200718899-8, Woden Act 2606, Australia, mailing date Oct. 6, 2010, pp. 5.

Written Opinion, Australian Patent Office, Woden Act 2606, Australia, mailing date Dec. 8, 2009, pp. 5.

* cited by examiner

Fig. 7

INTERRUPT REDUCTION METHOD IN TOUCH SCREEN CONTROLLER

CROSS-REFERENCE TO RELATED APPLICATIONS

The present application claims the benefit of U.S. Provisional Patent Application No. 61/002,122 filed on Nov. 6, 2007, which is hereby incorporated by reference in its entirety for all purposes as if fully set forth herein.

FIELD OF THE INVENTION

The present invention is related to touch screen controllers, and more particularly, a method for reducing the number of interrupts received by the touch screen controller.

BACKGROUND OF THE INVENTION

In the prior art, when touch is detected or data is ready, a touch screen controller will issue an interrupt request to a host. In an interrupt event a processor needs to conduct overhead processes (such as context switching) before and after performing the real task at hand. If, in every data acquired, there are a large number of interrupt events, this will waste processor/host resources. In a situation where the processor is still handling higher priority processes, an interrupt from the touch screen controller might be ignored. Ignoring interrupts may cause some data points to be lost, since the touch screen controller is waiting for commands from the processor, while the touch location might have moved in the meantime. A method to reduce the number of interrupts and, at the same time, acquire point data even if the processor is busy is desired.

Figure 1:
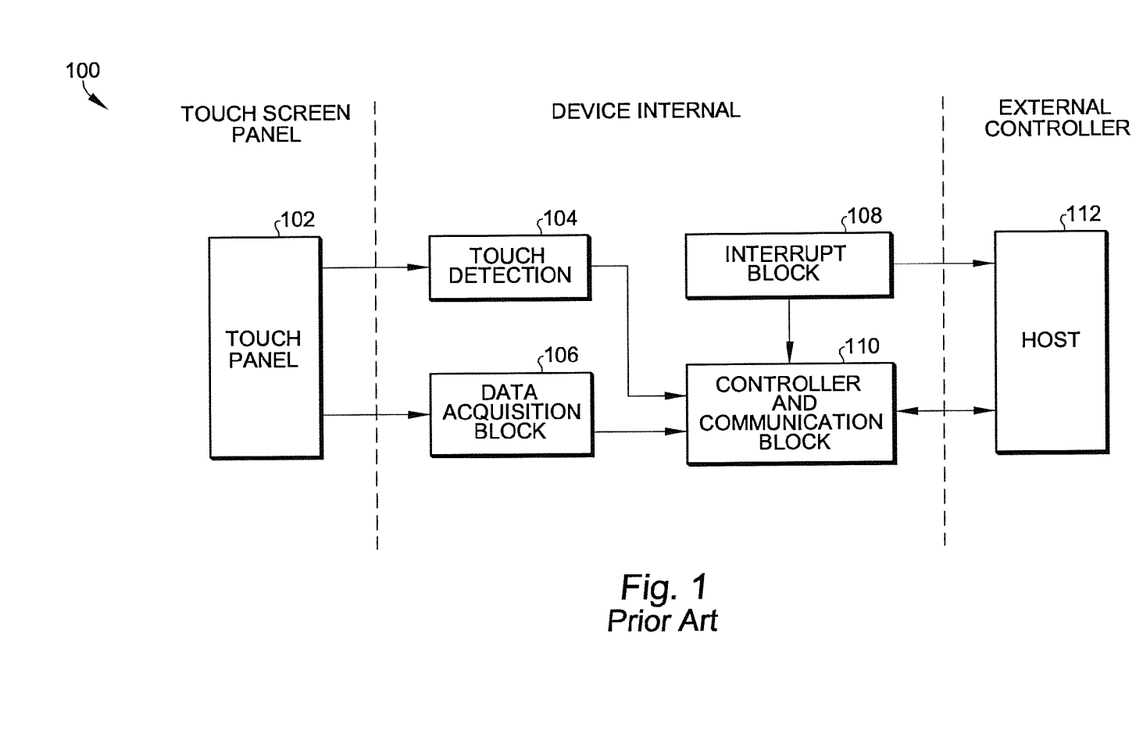
FIG. 1 is a block diagram of a prior art touch screen system.

Referring now to FIG. 1, a block diagram of a prior art touch detect system 100 is shown. Touch detect system includes a touch panel 102 having outputs coupled to a touch detection block 104 and a data acquisition block 106. The output of the touch detection block is received by a controller and communication block 110, which is in communication with data acquisition block 106. The controller and communication block 110 is also in communication with the interrupt block 108. A host 112 has input coupled to an output from the interrupt block 108, and also in communication with the host 112.

In the event of touch-detection, controller 110 issues an interrupt signal to host 112 and waits for the next command—whether to acquire data or ignore the touch. Once an "Acquire Data" command is given by host 112, controller 110 instructs data acquisition block 106 to acquire the data. When the data is ready, again controller 110 issues an interrupt signal to host 112 to read the data.

In other prior art systems, when touch is detected, controller 110 issues an interrupt signal as well as acquires the data at the same time. Once data is ready, another interrupt is issued. Touch detection interrupt (first interrupt) is to inform host 112 that touch is detected and to prepare the host to read the data when the second interrupt is coming.

In the prior art system shown in FIG. 1, where the data is automatically acquired when touch is detected, if the host 112 is busy during the issuance of a data ready interrupt, the current data will be overwritten by the next data. Hence, some of the touch points may be lost. Every time a data is ready, an interrupt is issued and host 112 needs to establish communication with the device to read the data What is desired, therefore, is a touch screen system in which interrupts to the controller are minimized while the ability to acquire all point data is preserved.

SUMMARY OF THE INVENTION

According to the present invention, integration of a FIFO memory, FIFO threshold and a timer, along with the other components of a touch screen system allows the number of interrupts to the touch screen controller to be reduced while allowing all point data to be acquired and preserved. In the first touch-detect event, an interrupt is issued to inform the host. The touch screen controller then automatically acquires data as long as touch is detected without host intervention. A FIFO threshold defines the minimum number of data points in FIFO memory before it issues an interrupt to inform the host that data is ready to be fetched. The timer is started once touch is detected. On every single data acquired, the timer is reset. In the event where touch is no longer detected (no more data acquisition), the timer keeps on counting until the time-up limit is reached. In this event, the touch screen controller will issue an interrupt informing the host the pen is lifted. The host then checks whether there is still data left in FIFO memory to be read.

It is an advantage of the present invention that the fewer number of interrupts issued, the more host resources can be preserved. In each interrupt event, the host needs to do overhead processes (context switching) before and after the real process is performed. In the case where the host is busy when an interrupt is issued (the interrupt is attended a bit late), the touch screen controller will still acquire new data, which is stored in FIFO memory. Hence, no data is missed. The foregoing and other objects, features and advantages of the invention will become more readily apparent from the following detailed description of a preferred embodiment of the invention, which proceeds with reference to the accompanying drawings.

DETAILED DESCRIPTION

Figure 2:
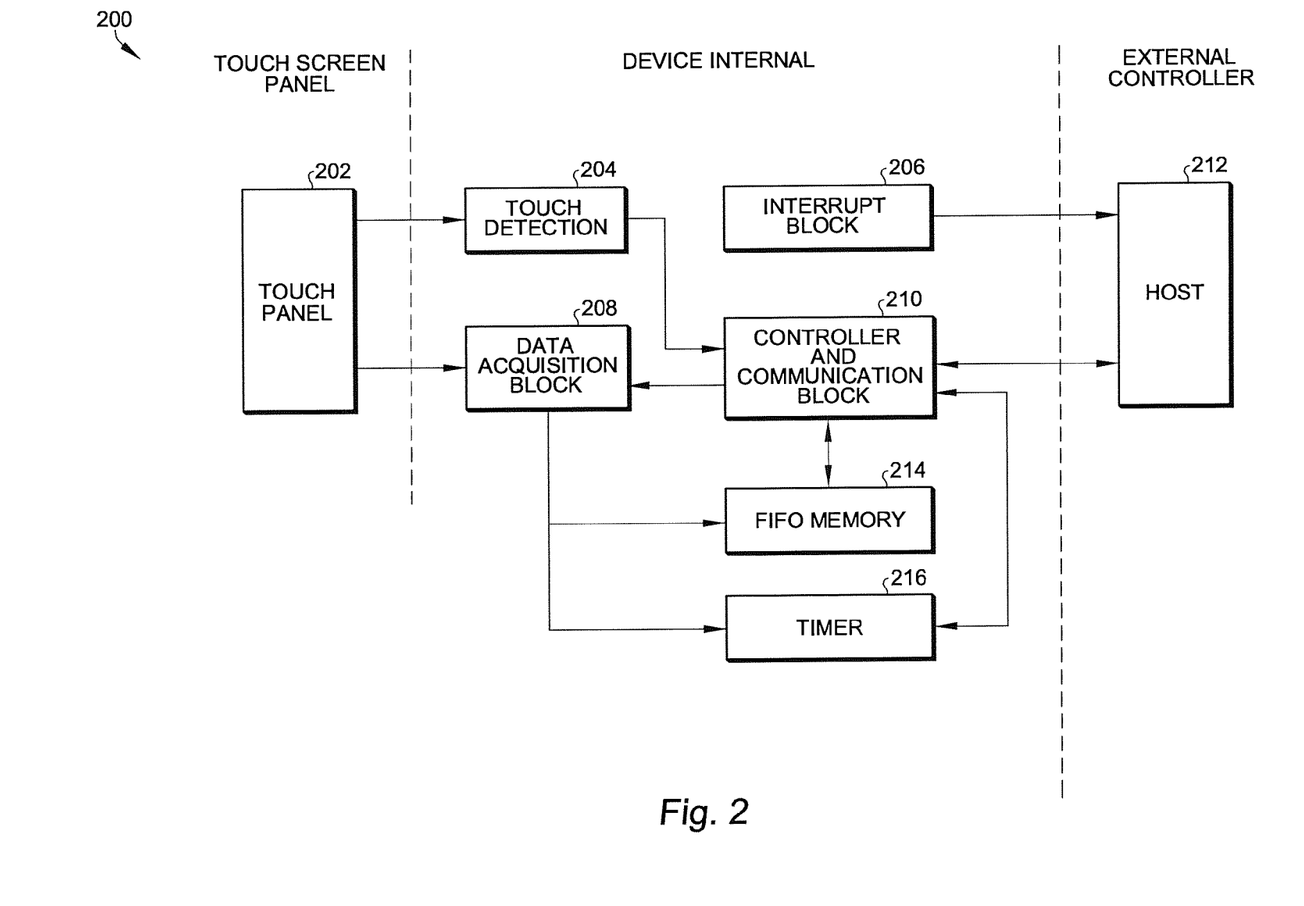
FIG. 2 is a block diagram of a touch screen system according to the present invention including a FIFO memory and a timer.

Referring now to FIG. 2, a block diagram of a touch screen system 200 according to the present invention is shown including previously described touch panel block 202, touch detection block 204, interrupt block 206, data acquisition block 208, controller and communication block 210, and host 212. Touch screen system 200 further includes a FIFO memory 214 and a timer 216. FIFO memory 214 receives data from the data acquisition block 208 and is in communication with the controller and communication block 210. Timer 216 also receives data from the data acquisition block 208 and is also in communication with controller and communication block 210.

Figure 3:
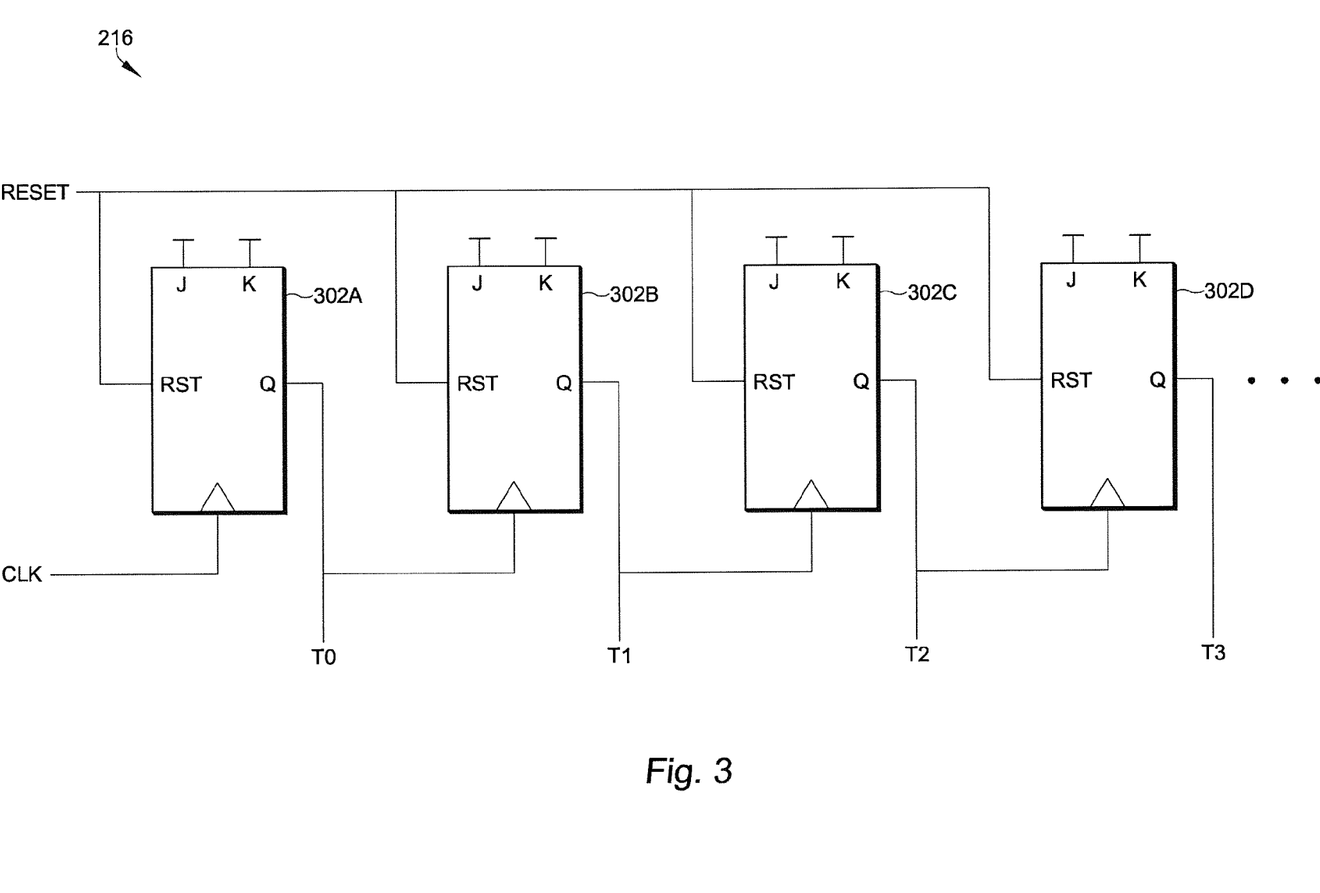
FIG. 3 is a schematic/block diagram of a timer for use in the touch screen system of FIG. 2, according to the present invention.

The block diagram/schematic of timer 216 is shown in FIG. 3. Timer 216 includes a plurality of J-K flip-flops, of which plurality four are shown in FIG. 3. A first flip-flop 302A has an input for receiving the CLK signal and a Q output for providing a T0 output. A second flip-flop 302B has an input tied to the T0 output and a Q output for providing a T1 output. A third flip-flop 302C has an input tied to the T1 output and a Q output for providing a T2 output. A fourth flip-flop 302D has an input tied to the T2 output and a Q output for providing a T3 output. The reset inputs of all of the flip-flops are tied together for receiving the RESET signal. The J and K inputs are tied high. Other timer circuits known in the art can be used in place of the particular circuit shown in FIG. 3.

When there is no touch, the RESET line is pulled LOW to reset timer 216. When a touch is detected, RESET is released HIGH to enable timer 216. In each data acquired, timer 216 is reset. If no more data is acquired, timer 216 continues running until a threshold is hit and an interrupt is issued to inform the system that the finger/pen has been lifted up.

Figure 4:
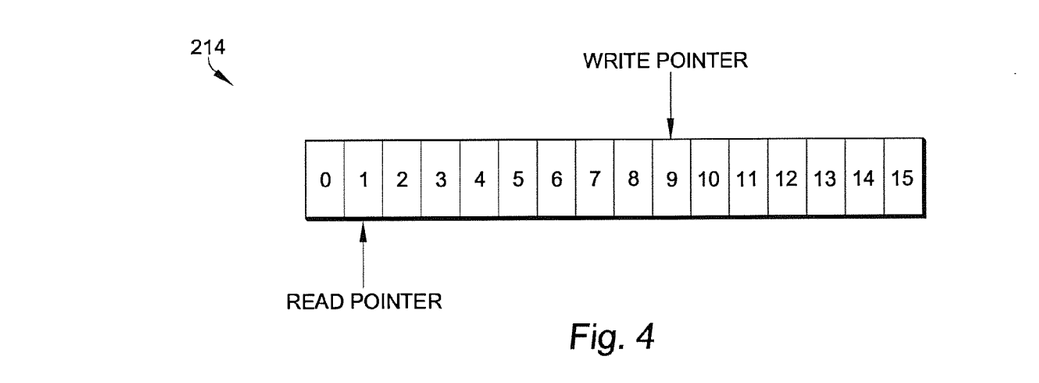
FIG. 4 is a schematic/block diagram of a FIFO memory for use in the touch screen system of FIG. 2, according to the present invention.

A simplified block diagram of FIFO memory 214 is shown in FIG. 4. Numbered blocks 0-15, represent memory locations that can either be empty or filled. A write pointer points to the next memory location to write next new data. After each write, the pointer is incremented. A read pointer points to the memory location for the next data read. After each read, the pointer is incremented. The number of data entries available is indicated by the difference between the write and read pointer.

The proposed solution according to an embodiment of the invention is explained in further detail below. In a "Touch Detect" event, controller 210 issues a command for data acquisition block 208 to acquire data. At the same time controller 210 also activates timer 216, which is reset by data acquisition block 208 every time new data is acquired. During a "Touch Detect" event, controller 210 gives an interrupt to host 212. Once activated, data acquisition block 208 automatically acquires data at a predetermined rate. In every successful data acquisition, data acquisition block 208 resets timer 216. The data acquired is stored in FIFO memory 214. If the number of the data in FIFO has reach some predetermined value, controller 210 gives an interrupt to host 212 to read all the data available in a cycle of communication. In the case of a touch lifted up, no more valid data is acquired, hence timer 216 counts until the time-up level is reached. If the timer hits the time-up level, controller 210 issue an interrupt to inform host 212 that no more touch is detected and host 212 may read all the remaining data in the FIFO memory 214. During a "Touch Detect" event, therefore, an interrupt is issued to inform host 212 that a touch has been detected. Controller 210 starts the timer 216 to count and commands the data acquisition block 208 to start to acquire the data.

The FIFO memory 214 according to an embodiment of the present invention is described in further detail below. All acquired data is stored in FIFO memory 214 under the control of touch screen controller 210. The stored data can be read immediately or after some number of data available in the memory. An adjustable threshold value defines the minimum number of available data in FIFO memory before controller gives an interrupt output to inform host to read the data. If host 212 is busy when an interrupt is issued and not attending to the request immediately, controller 210 continues to collect the next data and stores it in FIFO memory 214, hence no data is lost. Once host 212 is free, it can start to read the data available in FIFO memory 214.

The timer 216 is explained in further detail below according to an embodiment of the present invention. The timer 216 is reset by the data acquisition block 208 every time there is new valid data acquired. In the situation where the pen/finger is lifted up, some data may be available in the FIFO memory. No more data is acquired, hence the timer is now running until hits the time-up threshold. In this case, controller 210 issues another interrupt to host 212 to inform that no more touch is detected and host 212 may read remaining data available in the FIFO memory 214.

Figure 5:
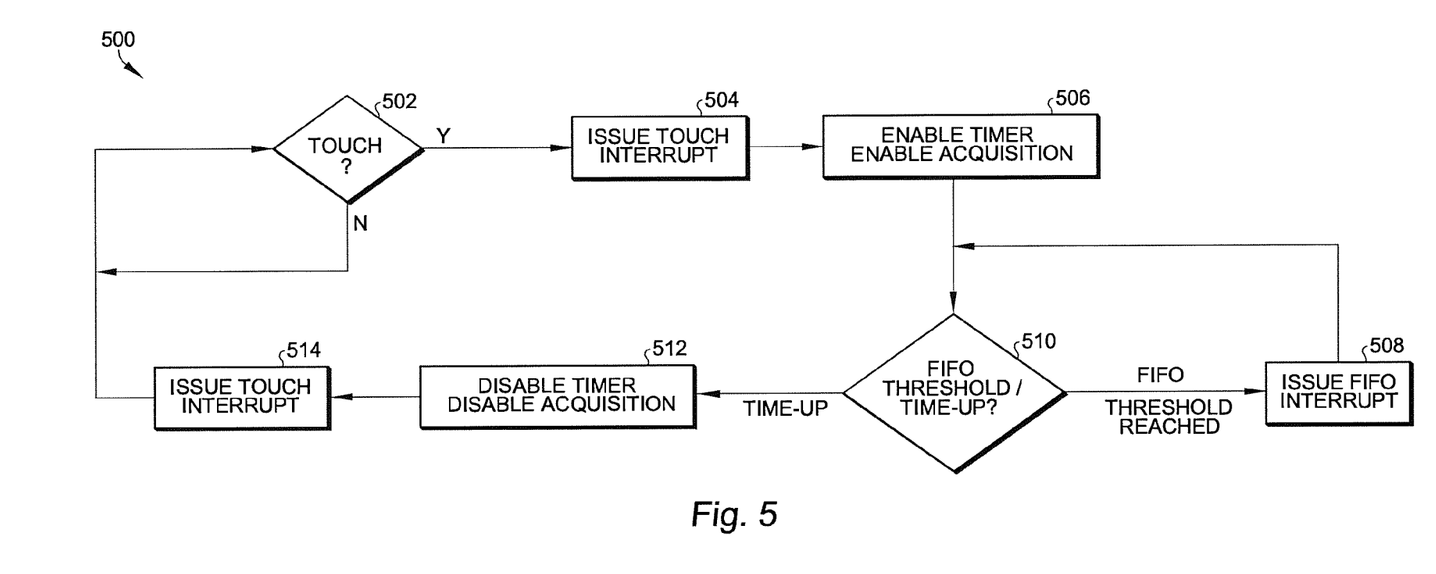
FIG. 5 is a first flowchart associated with the touch screen system shown in FIG. 2, according to the present invention.

The operation of the invention is shown in further detail in flow-chart format in FIG. 5. FIG. 5 illustrates the flow-chart of the controller and communication block shown in FIG. 2. Decision block 502 asks whether or not touch has been detected. If touch has been detected, then a touch interrupt is issued at block 504. In turn, the timer is enabled and acquisition is enabled at block 506. After the timer is enabled and acquisition has been enabled, decision block 510 asks whether or not the FIFO threshold has been reached or the time-up level has been reached. If the FIFO threshold has been reached, then a FIFO interrupt is issued at block 508. If the time-up level has been reached, then the timer is disabled and acquisition is disabled at block 512. Subsequently, a touch interrupt is issued at block 514.

Figure 6:
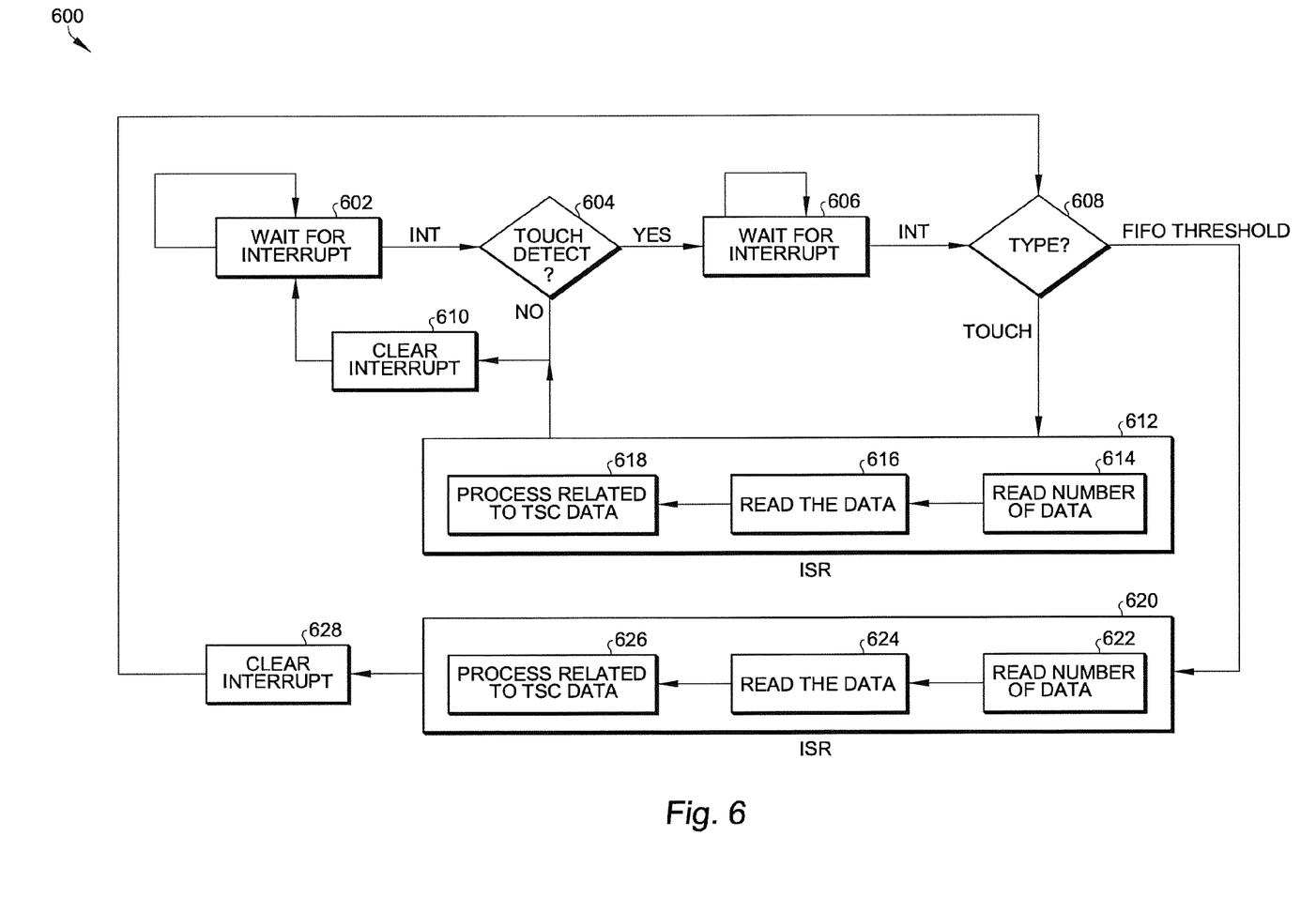
FIG. 6 is a second flowchart associated with the touch screen system shown in FIG. 2, according to the present invention.

The operation of the invention is shown in further detail in flow-chart format in FIG. 6. FIG. 6 illustrates the flow-chart of host/external microcontroller which uses the touch screen controller. The flow-chart shows how the interrupt issued by the device has to be handled. Block 602 waits for an interrupt. Once an interrupt has been detected, decision block 604 asks whether a touch has been detected. If no, then the interrupt is cleared at block 610. If yes, the block 606 again waits for an interrupt. Decision block 608 asks what type of interrupt has been detected. If a touch type of interrupt has been detected, then the method of the present invention moves through branch 612. Branch 612 includes reading the number of data entries at block 614, reading the data at block 616, and processing related TSC data at block 618. In FIG. 6, ISR refers to "Interrupt Service Routine" and TSC refers to "Touch Screen Data". If a FIFO threshold type of interrupt has been detected, then the method of the present invention moves through branch 620. Branch 620 includes equivalent steps 622, 624, and 626, followed by clearing the interrupt at block 628.

Figure 7:
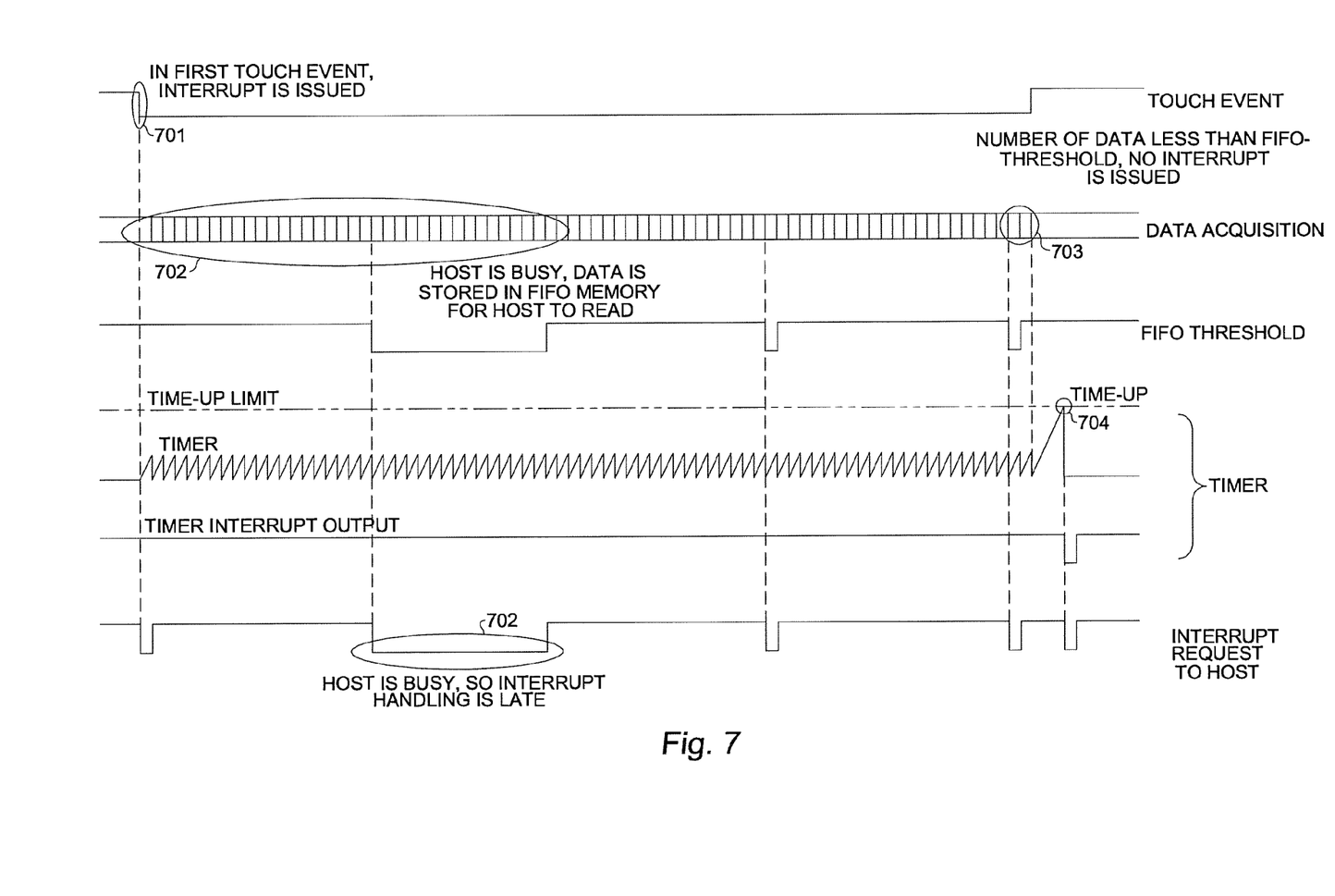
FIG. 7 is a timing diagram associated with the touch screen system shown in FIG. 2, according to the present invention.

The method of the present invention is further illustrated with reference to a timing diagram shown in FIG. 7 including the following signals: Touch Event, Data Acquisition, FIFO threshold, Timer, Timer Interrupt Output, and Interrupt Request to Host. Referring to the Touch Event signal, at the first touch event, an interrupt 701 is issued. If the host is busy, data is stored in the FIFO memory for the host to read later, and interrupt handling is late, at 702. If the number of data is less than the FIFO-threshold, no interrupt is issued at 703. Finally, the time-up limit of the timer is reached at 704.

While there have been described above the principles of the present invention in conjunction with specific circuits implementing the system and method of the present invention, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

We claim:

1. A touch detect system for coupling between a touch panel and a host, the touch detect system comprising:
   a FIFO memory;
   a timer that is enabled and reset upon transfer of touch data from the touch panel to the FIFO memory, and that is allowed to timeout after a period where no touch is detected since the last touch; and
   a controller that interrupts the host when the timer times out to signal to the host that touch data is available in the FIFO memory for reading.

2. The touch detect system of claim 1, further comprising a data acquisition block that transfers touch data from the touch panel to the FIFO memory.

3. The touch detect system of claim 2, wherein the data acquisition block enables and resets the timer.

4. The touch detect system of claim 1, wherein the controller further interrupts the host when the amount of touch data in the FIFO memory reaches a FIFO threshold.

5. The touch detect system of claim 1, wherein the FIFO threshold is adjustable.

6. A touch screen system comprising:
   a data acquisition block;
   a host;
   a FIFO memory; and
   a timer that is enabled and reset upon transfer of touch data from the data acquisition block to the FIFO memory, and that is allowed to timeout after a period where no touch is detected since the last touch; and
   a controller that interrupts the host when the timer times out to signal to the host that touch data is available in the FIFO memory for reading.

7. The touch screen system of claim 6 wherein the timer comprises a plurality of J-K flip-flops.

8. The touch screen system of claim 6 wherein the timer comprises reset and clock inputs, and an output.

9. The touch screen system of claim 6 wherein the controller further interrupts the host when the amount of touch data in the FIFO memory reaches.

10. The touch screen system of claim 9 wherein the threshold is adjustable.

11. A method for controlling a touch screen system comprising:
    buffering touch data from a touch panel in a FIFO memory;
    resetting a timer when touch data is stored in the FIFO memory;
    allowing the timer to timeout after a period where no touch is detected since the last touch; and
    interrupting a host when the timer times out to signal to the host that touch data is available in the FIFO memory for reading.

12. The method of claim 11 further comprising, interrupting the host when the amount of data in the FIFO memory has reached a threshold value, and for the host to read the data available in the FIFO memory.

13. The method of claim 12 further comprising, adjusting the threshold value.

14. The method of claim 11 wherein all acquired data is stored in the FIFO memory under the control of a touch screen controller.

* * * * *